(12) United States Patent
Isoda (10) Patent No.: US 9,876,932 B2
(45) Date of Patent: Jan. 23, 2018

(54) IMAGE PROCESSING APPARATUS, CONTROL METHOD THEREOF, AND STORAGE MEDIUM STORING PROGRAM

(71) Applicant: CANON KABUSHIKI KAISHA, Tokyo (JP)

(72) Inventor: Takashi Isoda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 13/928,619

(22) Filed: Jun. 27, 2013

(65) Prior Publication Data

US 2014/0002859 A1   Jan. 2, 2014

(30) Foreign Application Priority Data

Jun. 28, 2012 (JP) .................. 2012-146080

(51) Int. Cl.
*G06F 3/12* (2006.01)
*H04N 1/32* (2006.01)
*H04N 1/21* (2006.01)
*H04N 1/00* (2006.01)
*H04N 1/333* (2006.01)

(52) U.S. Cl.
CPC ....... *H04N 1/32416* (2013.01); *H04N 1/0023* (2013.01); *H04N 1/00225* (2013.01); *H04N 1/21* (2013.01); *H04N 1/32358* (2013.01); *H04N 1/33307* (2013.01); H04N 2201/0068 (2013.01); H04N 2201/0081 (2013.01); H04N 2201/3205 (2013.01); H04N 2201/3221 (2013.01); H04N 2201/3274 (2013.01); H04N 2201/33321 (2013.01); *H04N 2201/33328* (2013.01); *H04N 2201/33378* (2013.01)

(58) Field of Classification Search
CPC .. H04N 1/32416; H04N 1/21; H04N 1/00225; H04N 1/0023; H04N 1/32358; H04N 1/33307
USPC ........................................................ 358/1.15
See application file for complete search history.

(56) References Cited

U.S. PATENT DOCUMENTS 6,873,429 B2 * 3/2005 Matsuura .................. 358/1.15
6,988,123 B2 * 1/2006 LeClair .................. H04L 67/40
358/1.16

(Continued)

FOREIGN PATENT DOCUMENTS

JP    H11-168523 A    6/1999
JP    2009-124274     6/2009

(Continued)

OTHER PUBLICATIONS

Office Action for corresponding Japanese Patent Application No. 2012-146080 dated Jun. 27, 2016.

*Primary Examiner* — Neil R McLean
(74) *Attorney, Agent, or Firm* — Carter, DeLuca, Farrell & Schmidt, LLP (57) ABSTRACT

A transmission destination of image data is set, and image data obtained by scanning a document image is stored. When a received scan job request is that from the set transmission destination, the stored image data is converted according to parameters included in the scan job request, and the converted image data is transmitted to the transmission destination as a transmission source of the scan job request.

8 Claims, 9 Drawing Sheets

| RAW IMAGE FILE NAME | SCAN IDENTIFIER | DESTINATION | STORAGE TIME LIMIT |
|---|---|---|---|
| RAW IMAGE DATA FILE 1 | 1111 | PC1 | 2011/12/31 13:00 |
| | 1112 | PC2 | |
| | 1113 | PC7 | |
| | ⋮ | ⋮ | |
| | 1120 | PC23 | |
| RAW IMAGE DATA FILE 3 | 1211 | PC6 | 2012/01/31 17:00 |
| | ⋮ | ⋮ | |
| RAW IMAGE DATA FILE K | XXXX | PCXX | 2012/02/28 01:00 |
| | XXXY | PCXY | |
| | ⋮ | ⋮ | |
| | XXXZ | PCZZ | |

(56) References Cited

U.S. PATENT DOCUMENTS

| | | | |
|---|---|---|---|
| 7,545,529 B2* | 6/2009 | Borrey | H04N 1/40 |
| | | | 358/1.14 |
| 7,843,586 B2* | 11/2010 | Ferlitsch | 358/1.15 |
| 7,933,033 B2* | 4/2011 | Ohishi | H04N 1/00204 |
| | | | 358/1.13 |
| 8,619,302 B2* | 12/2013 | Katahira | 358/1.15 |
| 2007/0208863 A1* | 9/2007 | Otsuka et al. | 709/227 |
| 2011/0030068 A1* | 2/2011 | Imai | 726/27 |
| 2012/0147440 A1* | 6/2012 | Shindo | H04N 1/33307 |
| | | | 358/474 |

FOREIGN PATENT DOCUMENTS

| | | |
|---|---|---|
| JP | 2009-135575 A | 6/2009 |
| JP | 2009-267701 A | 11/2009 |
| JP | 2011-114491 A | 6/2011 |

* cited by examiner

FIG. 1

Prior Art

| RAW IMAGE FILE NAME | SCAN IDENTIFIER | DESTINATION | STORAGE TIME LIMIT |
|---|---|---|---|
| RAW IMAGE DATA FILE 1 | 1111 | PC1 | 2011/12/31 13:00 |
| | 1112 | PC2 | |
| | 1113 | PC7 | |
| | ⋮ | ⋮ | |
| | 1120 | PC23 | |
| RAW IMAGE DATA FILE 3 | 1211 | PC6 | 2012/01/31 17:00 |
| ⋮ | ⋮ | ⋮ | ⋮ |
| RAW IMAGE DATA FILE K | XXXX | PCXX | 2012/02/28 01:00 |
| | XXXY | PCXY | |
| | ⋮ | ⋮ | |
| | XXXZ | PCZZ | |

| RAW IMAGE FILE NAME | SCAN IDENTIFIER | DESTINATION | STORAGE TIME LIMIT |
|---|---|---|---|
| RAW IMAGE DATA FILE 1 | 1111 | PC1 | |
| | 1112 | PC2 | 2011/12/31 13:00 |
| | 1113 | PC7 | |
| | ... | ... | |
| | 1120 | PC23 | |
| RAW IMAGE DATA FILE 3 | 1211 | PC6 | 2012/01/31 17:00 |
| ... | ... | ... | |
| RAW IMAGE DATA FILE K | XXXX | PCXX | |
| | XXXY | PCXY | 2012/02/28 01:00 |
| | ... | ... | |
| | XXXZ | PCZZ | |

8B

| RAW IMAGE FILE NAME | SCAN IDENTIFIER | DESTINATION | STORAGE TIME LIMIT |
|---|---|---|---|
| RAW IMAGE DATA FILE 1 | 1111 | PC1 | |
| | 1112 | PC2 | 2011/12/31 13:00 |
| | 1113 | PC7 | |
| | ... | ... | |
| | 1120 | PC23 | |
| RAW IMAGE DATA FILE 3 | 1211 | PC6 | 2012/01/31 17:00 |
| ... | ... | ... | |
| RAW IMAGE DATA FILE K | XXXX | PCXX | |
| | XXXY | PCXY | 2012/02/28 01:00 |
| | ... | ... | |
| | XXXZ | PCZZ | |

IMAGE PROCESSING APPARATUS, CONTROL METHOD THEREOF, AND STORAGE MEDIUM STORING PROGRAM

BACKGROUND OF THE INVENTION

Field of the Invention

The present invention relates to a technique for generating image data and transmitting the image data to a destination using an image processing apparatus.

Description of the Related Art

In recent years, an image processing apparatus which implements a scan method called a pseudo Push Scan that executes the following operation has appeared.

Figure 1:
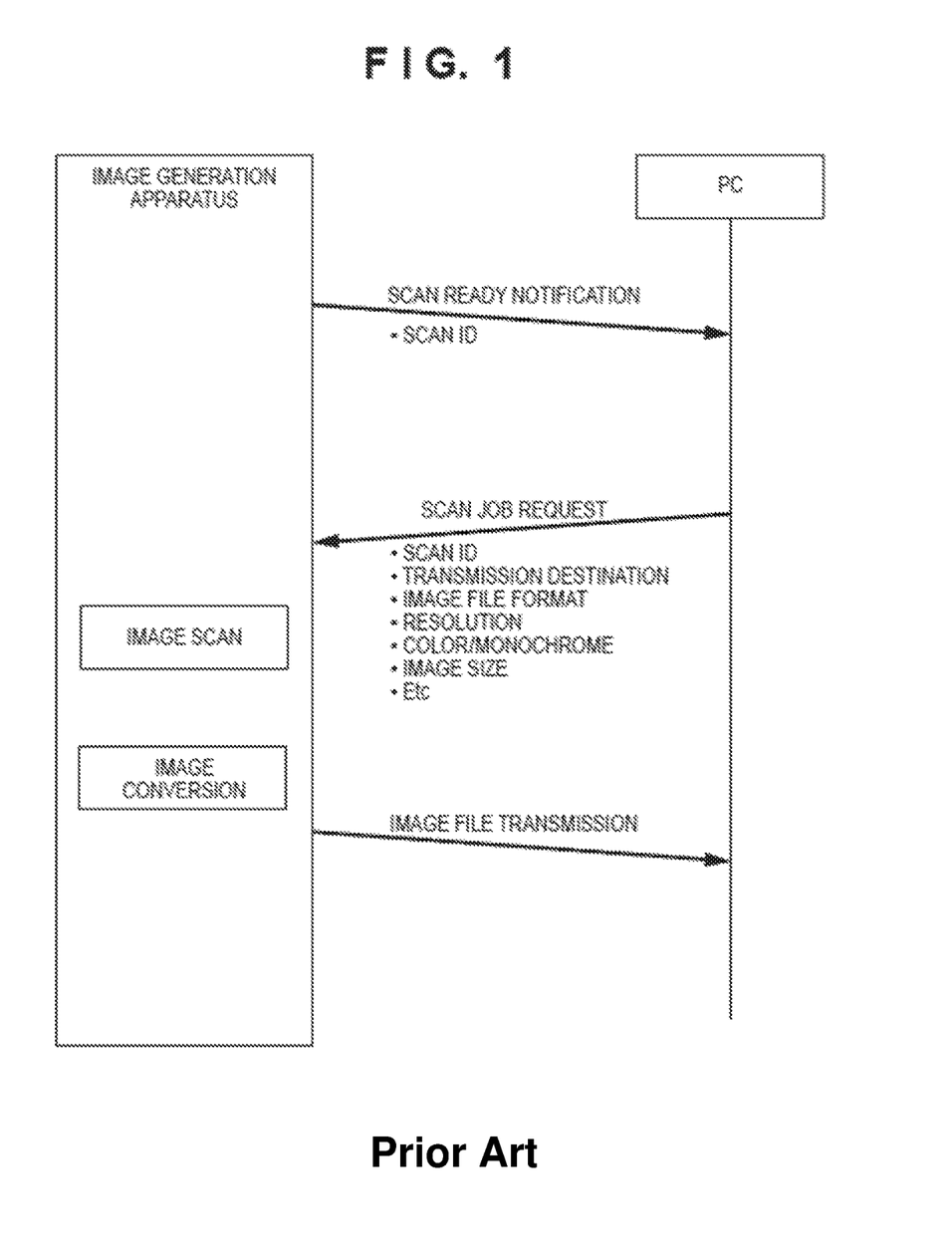
FIG. 1 is a chart showing a sequence example of a pseudo Push Scan according to the related art.

In a system including an image processing apparatus and information terminal (to be referred to as a PC hereinafter), which are connected via a network, when the image processing apparatus is ready for an image scan, it notifies the PC as a destination designated by the user of a scan ready message via the network. Upon reception of the scan ready message, the PC transmits a scan job request including designation of an image format to be acquired and the like to that image processing apparatus. Upon reception of this scan job request, the image processing apparatus generates image data by scanning a document image using a scanner, and converts the image data into file data of the format designated by the scan job request. Then, the image processing apparatus outputs this converted file data to the PC. FIG. 1 shows this sequence.

In FIG. 1, when the image processing apparatus is ready for an image scan, it transmits a scan ready message to the PC. After that, when a scan job request which requests to scan a document image and to transmit the data to the PC is received from the PC, the image processing apparatus converts image data obtained by scanning a document image into a format, resolution, and the like requested by the scan job request. The image processing apparatus can transmit an image file in response to the scan job request from the PC by transmitting the image file generated in this way to the PC.

The Microsoft Corporation specifies a communication protocol required for a computer to use a Web service called "Web Service On Device (to be abbreviated as "WSD" hereinafter)" provided by an electronic apparatus such as an image forming apparatus. In this specification, a protocol (WSD scan) which supports a pseudo Push Scan is specified.

Also, for example, Japanese Patent Laid-Open No. 2009-267701 describes an image forming apparatus which can execute a pseudo Push Scan according to the WSD scan specification.

After reception of a scan job request, a conventional image processing apparatus generates image data by scanning a document image, converts that image data into a designated image format included in the scan job request, and transmits the converted data to a PC as a request source. However, since the designated image format depends on settings and operations of PCs, when there are a plurality of PCs as destinations of a pseudo Push Scan for a single image scan, the image processing apparatus has to convert image data into image formats respectively designated by the plurality of PCs designated as destinations. At this time, if image formats designated by the respective PCs are incompatible with each other, the image processing apparatus cannot cope with scan job requests from all the PCs by a single image scan and image conversion. In such case, the image processing apparatus has to execute a document scan and image data conversion for each scan job request.

In general, as for a time period from when the PC receives a scan ready message until it outputs a scan job request, there is no special temporal limitation in terms of the protocol. Therefore, conventionally, when a document includes secret information, after the user sets that document on a scanning unit of the image processing apparatus, he or she cannot leave from the image processing apparatus until a scan job request is received from the PC and the scanning unit completes scanning of the document. Therefore, when image data is transmitted from the image processing apparatus which supports a pseudo Push Scan, the user cannot determine how long he or she has to stand on beside the image processing apparatus since a reception timing of a scan job request from the PC is unknown.

SUMMARY OF THE INVENTION

An aspect of the present invention is to eliminate the above-mentioned problems with the conventional technology.

The present invention provides a technique which allows to transmit image data of formats according to requests from a plurality of destinations to the plurality of destinations by scanning a document image only once even when image data of a document is to be transmitted to the plurality of destinations.

The present invention in its first aspect provides an image processing apparatus comprising: a scanning unit configured to generate image data by scanning a document; a setting unit configured to set a transmission destination of the image data; a storage unit configured to store image data generated by the scanning unit; a reception unit configured to receive a scan job request; a conversion unit configured to convert, in a case where a scan job request received by the reception unit is a scan job request from a transmission destination set by the setting unit, the image data stored in the storage unit in accordance with a parameter included in the scan job request; and a transmission unit configured to transmit the image data converted by the conversion unit to a transmission destination as a transmission source of the scan job request.

The present invention in its second aspect provides a control method of controlling an image processing apparatus, comprising: a scanning step of generating image data by scanning a document; a setting step of setting a transmission destination of the image data; a storage step of storing image data generated in the scanning step in a memory; a reception step of receiving a scan job request; a conversion step of converting, in a case where a scan job request received in the reception step is a scan job request from a transmission destination set in the setting step, the image data stored in the memory in accordance with a parameter included in the scan job request; and a transmission step of transmitting the image data converted in the conversion step to a transmission destination as a transmission source of the scan job request.

The present invention in its third aspect provides a computer-readable storage medium storing a program for controlling a computer to execute: a scanning step of generating image data by scanning a document; a setting step of setting a transmission destination of the image data; a storage step of storing image data generated in the scanning step in a memory; a reception step of receiving a scan job request; a conversion step of converting, in a case where a scan job request received in the reception step is a scan job request from a transmission destination set in the setting step, the image data stored in the memory in accordance with a parameter included in the scan job request; and a transmission step of transmitting the image data converted in the conversion step to a transmission destination as a transmission source of the scan job request.

According to the present invention, even when image data of a document is to be transmitted to a plurality of destinations, image data of formats according to requests from the plurality of destinations can be transmitted to the plurality of destinations by scanning a document image only once.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 2:
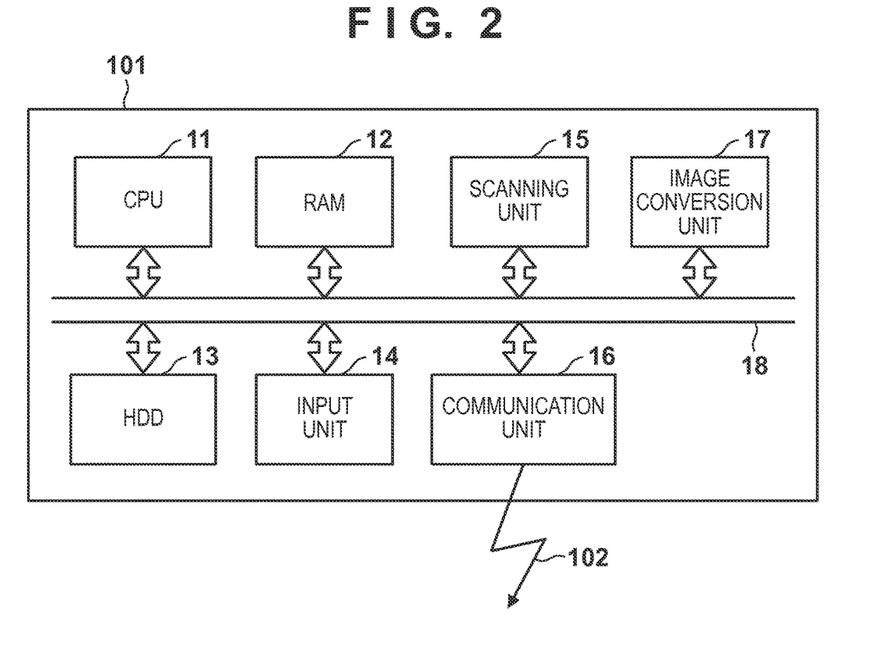
FIG. 2 is a block diagram for explaining the hardware arrangement of an image processing apparatus according to an embodiment of the present invention.

FIG. 2 is a block diagram for explaining the hardware arrangement of an image processing apparatus 101 according to an embodiment of the present invention.

This image processing apparatus 101 is connected to a plurality of other apparatuses via a network 102. A CPU 11 controls this image processing apparatus 101 as a whole, expands an OS and various programs installed in an HDD (Hard Disk Drive) 13 onto a RAM 12, and executes the expanded programs, thus implementing various kinds of control (to be described later). The RAM 12 temporarily holds various data, and provides a work area of the CPU 11. An input unit 14 has a display unit such as a touch panel, and is used to input various data and to make various settings via a GUI (Graphical User Interface). A scanning unit 15 includes, for example, a scanner and scans a document image to generate image data. A communication unit 16 controls communications with external apparatuses via the network 102. An image conversion unit 17 converts, for example, raw image data generated by the scanning unit 15 into data of a designated image format and resolution. A main bus 18 connects the CPU 11 to the aforementioned units to transfer various data, control signals, and the like. Note that in this embodiment, the CPU 11 controls the RAM 12, HDD 13, input unit 14, scanning unit 15, communication unit 16, and image conversion unit 17 via the main bus 18 to implement various operations according to this embodiment unless otherwise specified. Note that the HDD 13 is a large-capacity nonvolatile storage unit, which may be various memory cards, a ROM, a flash memory, a USB memory, and the like in place of the HDD.

Figure 3:
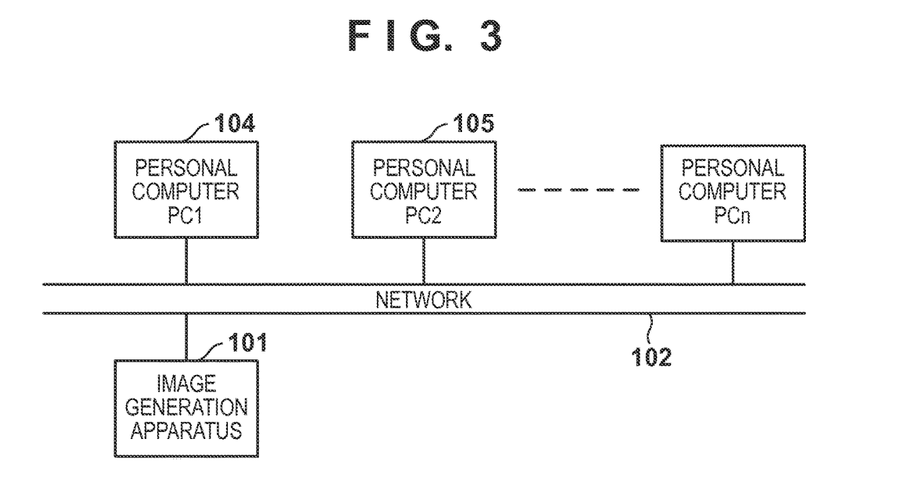
FIG. 3 is a diagram showing the arrangement of a system including the image processing apparatus according to the embodiment.

FIG. 3 is a diagram showing the arrangement of a system including the image processing apparatus 101 according to the embodiment.

In this system, the image processing apparatus 101 and a plurality of personal computers (to be referred to as PCs hereinafter) 104 and 105 are connected via the network 102.

Figure 4A:
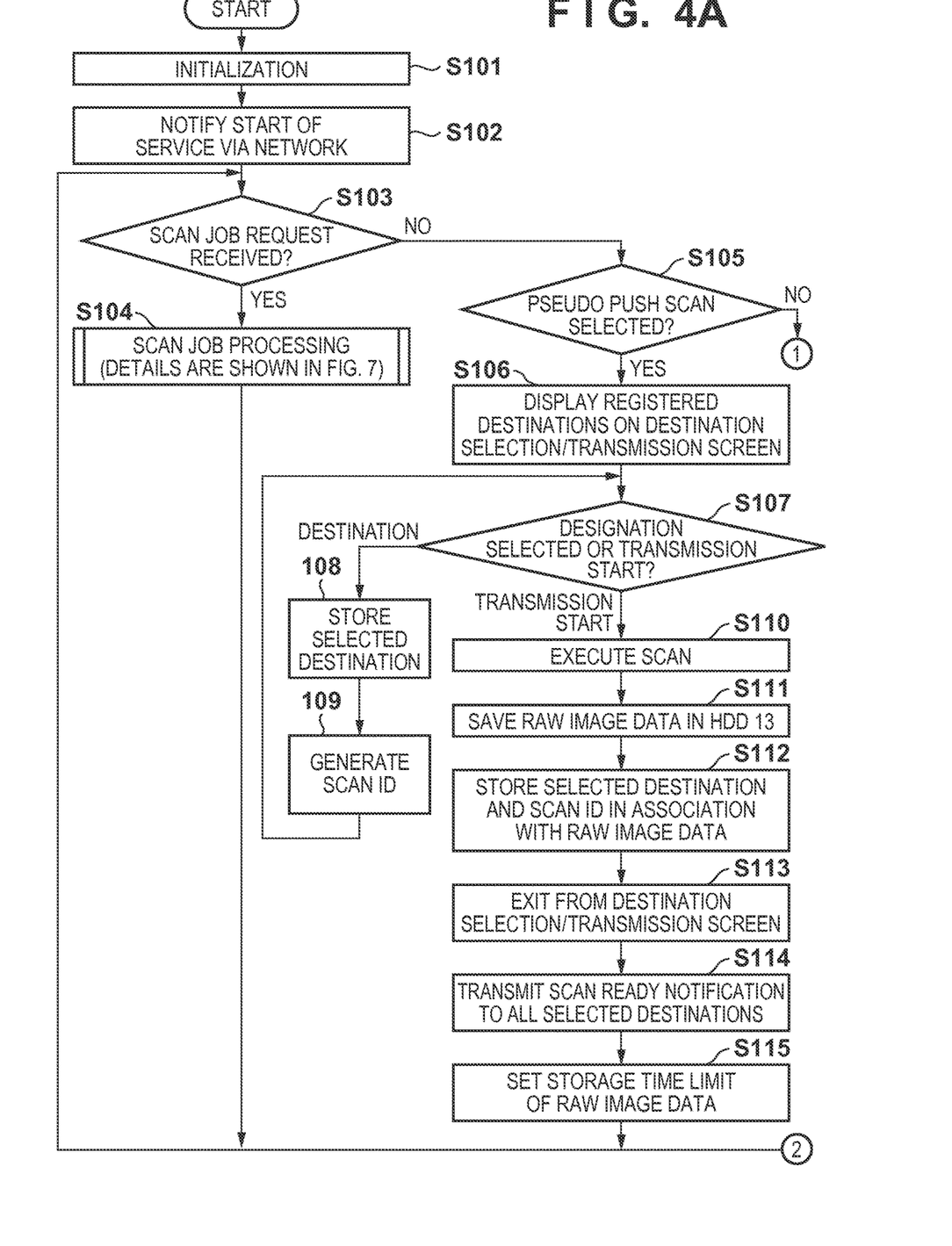
FIGS. 4A and 4B are flowcharts for explaining processing to be executed by the image processing apparatus according to the embodiment.
Figure 4B:
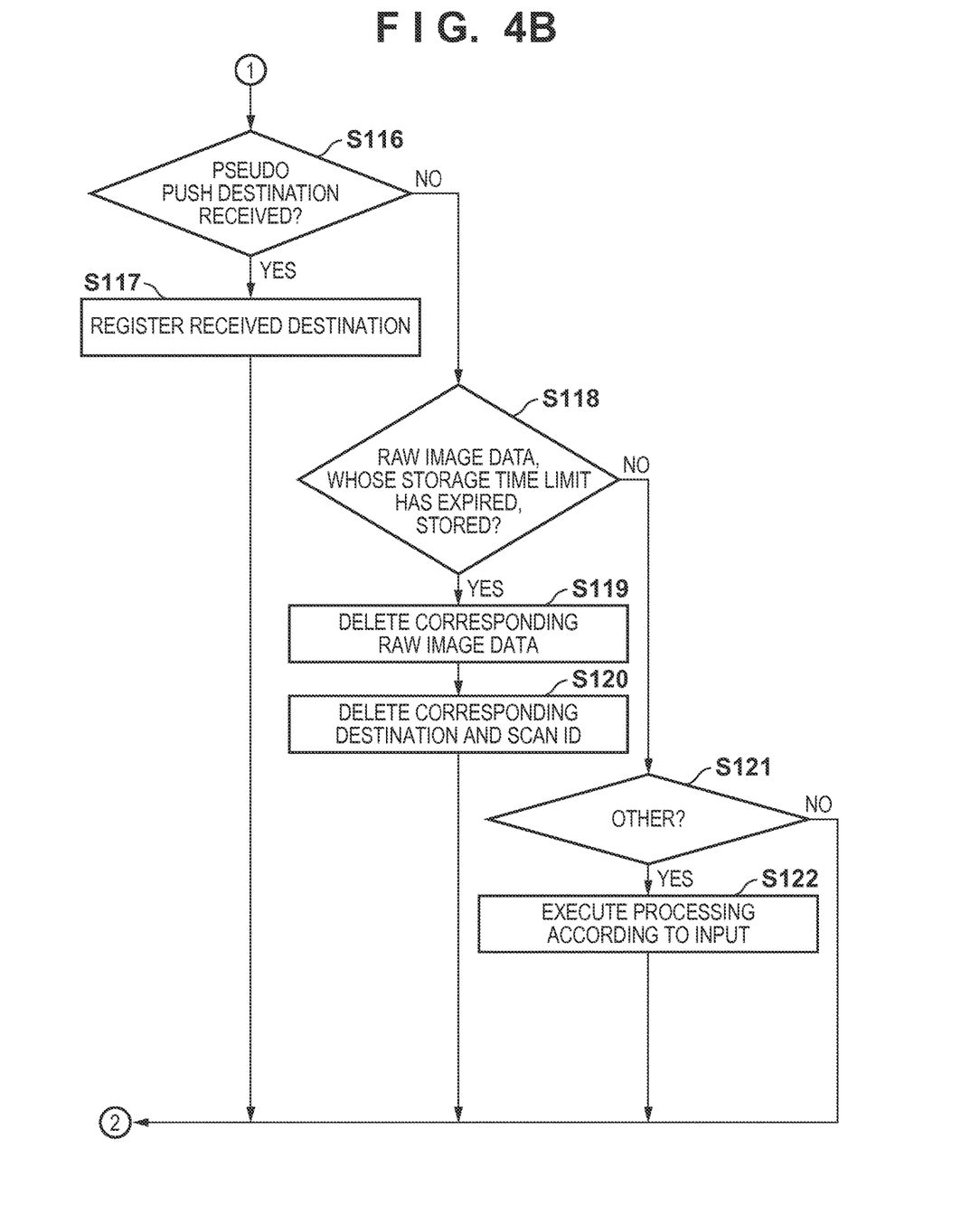

FIGS. 4A and 4B are flowcharts for explaining processing to be executed by the image processing apparatus 101 according to this embodiment. Note that a program required to implement this processing is installed in the HDD 13, is expanded on the RAM 12 when it is executed, and is executed under the control of the CPU 11.

This processing is started when the power supply of the image processing apparatus 101 is turned on. In step S101, the CPU 11 executes initialization processing. After completion of the initialization, the process advances to step S102, and the CPU 11 publicizes a service supported by this image processing apparatus 101 to the PC 104, PC 105, and the like via the communication unit 16 and network 102. As for this service publicize method, various methods have been proposed and put into practical use. However, this method is not directly related to the present invention, and a detailed description thereof will not be given. Next, the process advances to step S103, and the CPU 11 determines whether or not a scan job request is received from a PC via the communication unit 16 and network 102. If the scan job request is received, the process advances to step S104; otherwise, the process advances to step S105.

The CPU 11 determines in step S105 whether or not a selection notification of a pseudo Push Scan function is received via the input unit 14. If the selection notification of the pseudo Push Scan function is received, the process advances to step S106, and the CPU 11 displays a pseudo Push Scan destination selection/transmission start screen of already registered destinations to the input unit 14.

Figure 5:
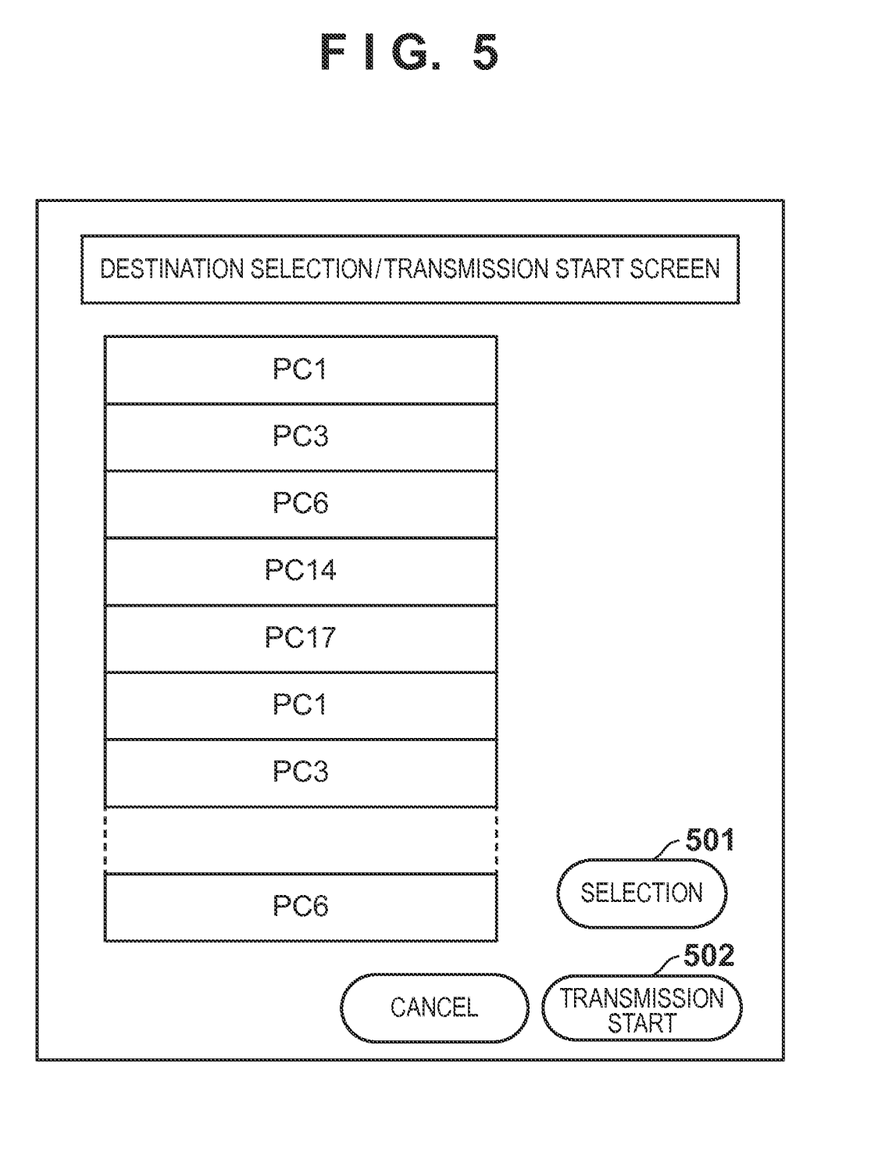
FIG. 5 is a view for explaining an example of a transmission destination selection/transmission start screen.

FIG. 5 shows an example of this transmission destination selection/transmission start screen.

In FIG. 5, when the user selects a displayed name of a PC and presses a "transmission start" button, he or she can set that PC as a transmission destination of image data. On this screen, the user can select a plurality of destinations.

Using this screen, the user can select one or more destinations to which he or she wants to transmit image data. The CPU 11 determines in step S107 whether the user presses a "selection" button 501 to select a new transmission destination or the "transmission start" button 502 to select transmission start via the input unit 14. If the CPU 11 determines that the user presses the "selection" button 501, the process advances to step S108, and the CPU 11 stores the selected transmission destination as a transmission destination. Then, the process advances to step S109, and the CPU 11 generates a scan ID (scan identifier) for the selected transmission destination and stores the scan ID in association with the selected transmission destination. Then, the process returns to step S107.

Figure 6:
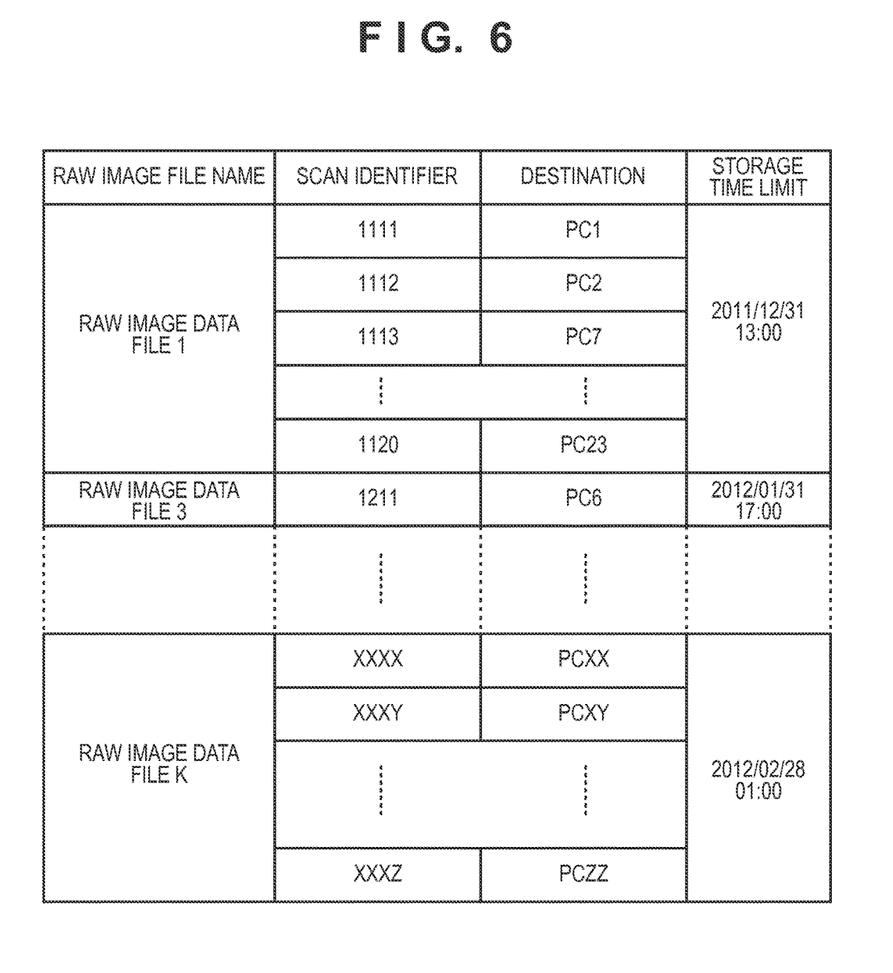
FIG. 6 is a view showing an example of a data format used to store raw image data, scan identifiers, and destinations according to the embodiment.

FIG. 6 shows an example of a data format used to store raw image data, scan identifiers, and destinations according to the embodiment.

As can be seen from FIG. 6, a plurality of scan identifiers and a plurality of destinations are set for one image data file. Furthermore, a storage time limit is set for each image data file.

On the other hand, if the CPU 11 determines in step S107 that the user presses the "transmission start" button 502, the process advances to step S110, and the CPU 11 activates the scanning unit 15 to optically scan a document image, thus generating raw image data. Then, the process advances to step S111, and the CPU 11 stores the generated raw image data in the HDD 13. The process then advances to step S112, and the CPU 11 stores the generated raw data in association with all combinations of destinations and scan IDs stored in step S109 (see FIG. 6).

The process then advances to step S113, and the CPU 11 transits the transmission destination list screen displayed on the input unit 14 to a previous screen. Then, the process advances to step S114, and the CPU 11 transmits scan ready notifications including the associated scan IDs to PCs as all the transmission destinations stored in step S109 via the communication unit 16 and network 102. The process advances to step S115, and the CPU 11 sets a storage time limit for the raw image data stored in step S111. The process then returns to step S103.

On the other hand, if the CPU 11 determines in step S105 that no selection notification of the pseudo Push Scan function is received, the process advances to step S116, and the CPU 11 determines whether or not a pseudo Push Scan destination registration request is received via the network 102 and communication unit 16. If the pseudo Push Scan destination registration request is received, the process advances to step S117, and the CPU 11 registers the received destination. Then, the process returns to step S103.

If the CPU 11 determines in step S116 that no pseudo Push Scan destination registration request is received, the process advances to step S118, and the CPU 11 determines whether raw image data whose storage time limit has been reached is stored in the HDD 13. If raw image data whose storage time limit has been reached is stored, the process advances to step S119, and the CPU 11 deletes that raw image data form the HDD 13. Then, the process advances to step S120, and the CPU 11 deletes the destinations, scan IDs, and storage time limit associated with that raw image data. After that, the process returns to step S103.

If the CPU 11 determines in step S118 that no raw image data whose storage time limit has been reached is stored in the HDD 13, the process advances to step S121, and the CPU 11 checks whether or not a request of another processing is received. If the request of the other processing is received, the process advances to step S122, and the CPU 11 executes processing corresponding to that request. Then, the process returns to step S103. On the other hand, if no request of the other processing is received, the process returns to step S103.

If the CPU 11 determines in step S103 that the scan job request is received from the PC, the process advances to step S104, and the CPU 11 executes scan job request processing. This processing will be described in detail later with reference to FIG. 7.

As described above, according to this embodiment, a plurality of transmission destinations of image data can be selected and registered, and raw image data obtained by scanning a document image is stored in association with these plurality of destinations. Thus, when a scan job request is received from that destination, corresponding image data can be transmitted to that destination as a request source.

Figure 7:
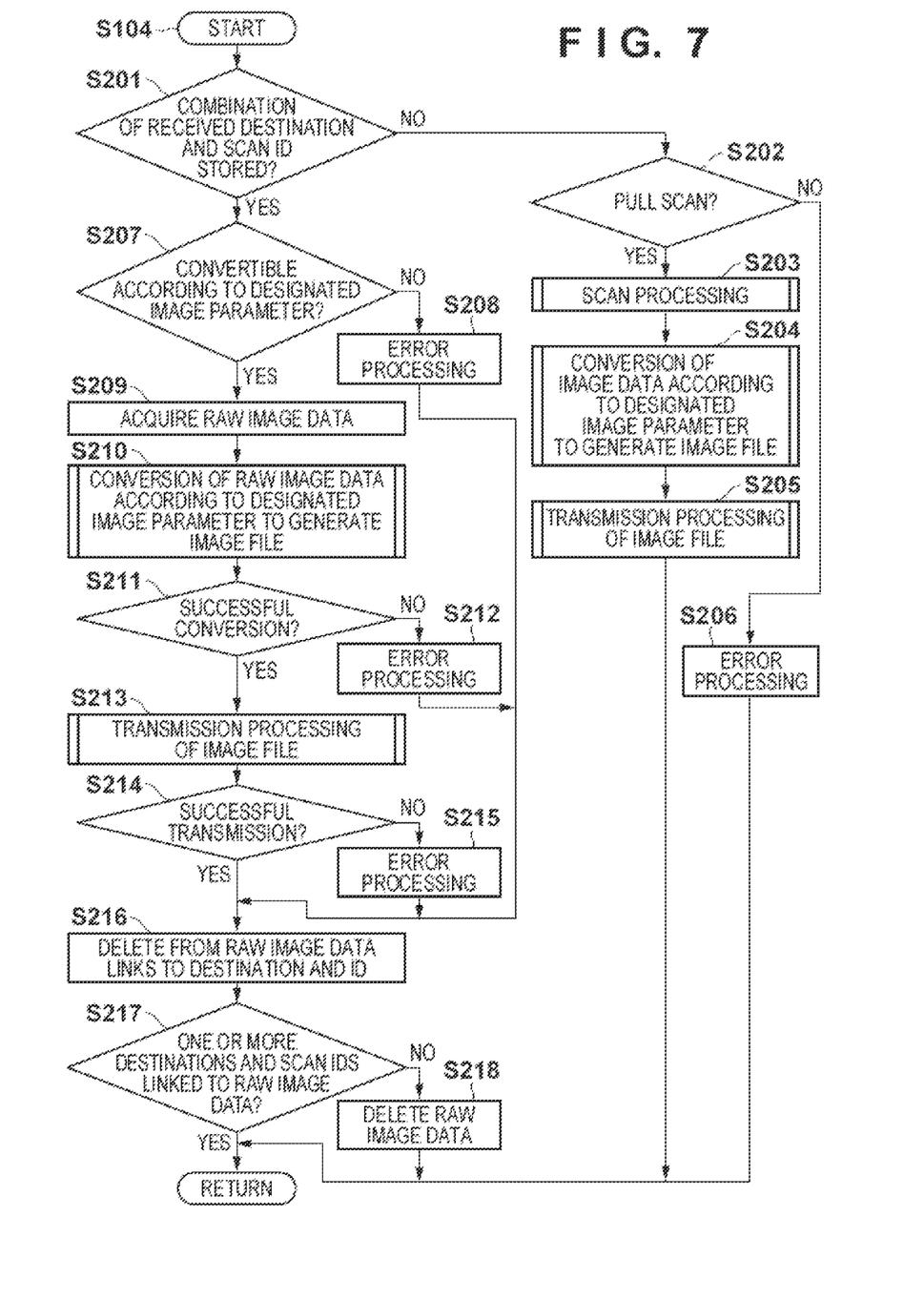
FIG. 7 is a flowchart for explaining processing of the image processing apparatus in response to a scan job request in step S104 of FIGS. 4A and 4B.

FIG. 7 is a flowchart showing the processing of the image processing apparatus 101 in response to the scan job request in step S104 of FIGS. 4A and 4B. Note that a program required to implement this processing is installed in the HDD 13, is expanded on the RAM 12 when it is executed, and is executed under the control of the CPU 11.

The CPU 11 checks in step S201 whether or not a combination of a destination and scan ID included in the received scan job request matches any of stored combinations of destinations and scan IDs. If no match is found, the process advances to step S202, and the CPU 11 determines whether or not the scan job request is a Pull Scan request. If the scan job request is a Pull Scan request, the process advances to step S203, and the CPU 11 activates the scanning unit 15 to optically scan a document image, thus generating image data. Then, the process advances to step S204, and the CPU 11 controls the image conversion unit 17 to generate an image file based on the image data in accordance with image parameters (information such as a file format, monochrome/color (color mode), paper size, and resolution) included in the received scan job request. The process then advances to step S205, and the CPU 11 outputs the converted image file to a destination included in the scan job request via the communication unit 16 and network 102. On the other hand, if the CPU determines in step S202 that the scan job request is not a Pull Scan request, it judges an abnormality. Then, the process advances to step S206 to execute error processing, thus discarding the received scan job request. These processes of steps S202 to S206 correspond to general Pull Scan processing.

On the other hand, if the CPU 11 determines in step S201 that a combination of a destination and scan ID included in the received scan job request is stored, the process advances to step S207. The CPU 11 determines in step S207 whether or not the image conversion unit 17 can generate an image file designated by image parameters (a file format, monochrome/color, paper size, resolution, etc.) as specifications of image data included in the received scan job request. If the CPU 11 judges that the image conversion unit 17 cannot generate that image file, the process advances to step S208, and the CPU 11 judges an error and discards that scan job request. Then, the process advances to step S216.

On the other hand, if the CPU 11 judges in step S207 that the image conversion unit 17 can generate the designated image file, the process advances to step S209, and the CPU 11 acquires raw image data associated with the stored destination and scan ID, which match those included in the request, from the HDD 13. Then, the process advances to step S210, and the CPU 11 controls the image conversion unit 17 to convert the raw image data according to image parameters (a file format, monochrome/color, paper size, resolution, etc.) included in the received scan job request, thus generating an image file. The process then advances to step S211, and the CPU 11 determines whether or not the conversion has succeeded. If the conversion has failed, the CPU 11 judges an error, and the process advances to step S215. In step S215, the CPU 11 discards the scan job request, and the process then advances to step S216.

If the CPU 11 determines in step S211 that the conversion has succeeded, that is, an image file can be generated, the process advances to step S213, and the CPU 11 transmits that generated image file to a destination included in the scan job request via the communication unit 16 and network 102. The CPU 11 then determines in step S214 whether or not the transmission has succeeded. If the transmission has failed, the process advances to step S215 to discard the scan job request. The process then advances to step S216. On the other hand, if the transmission has succeeded, the process advances to step S216, and the CPU 11 deletes links between the raw image data, and the destination and scan ID, which are stored in the HDD 13.

Figure 8:
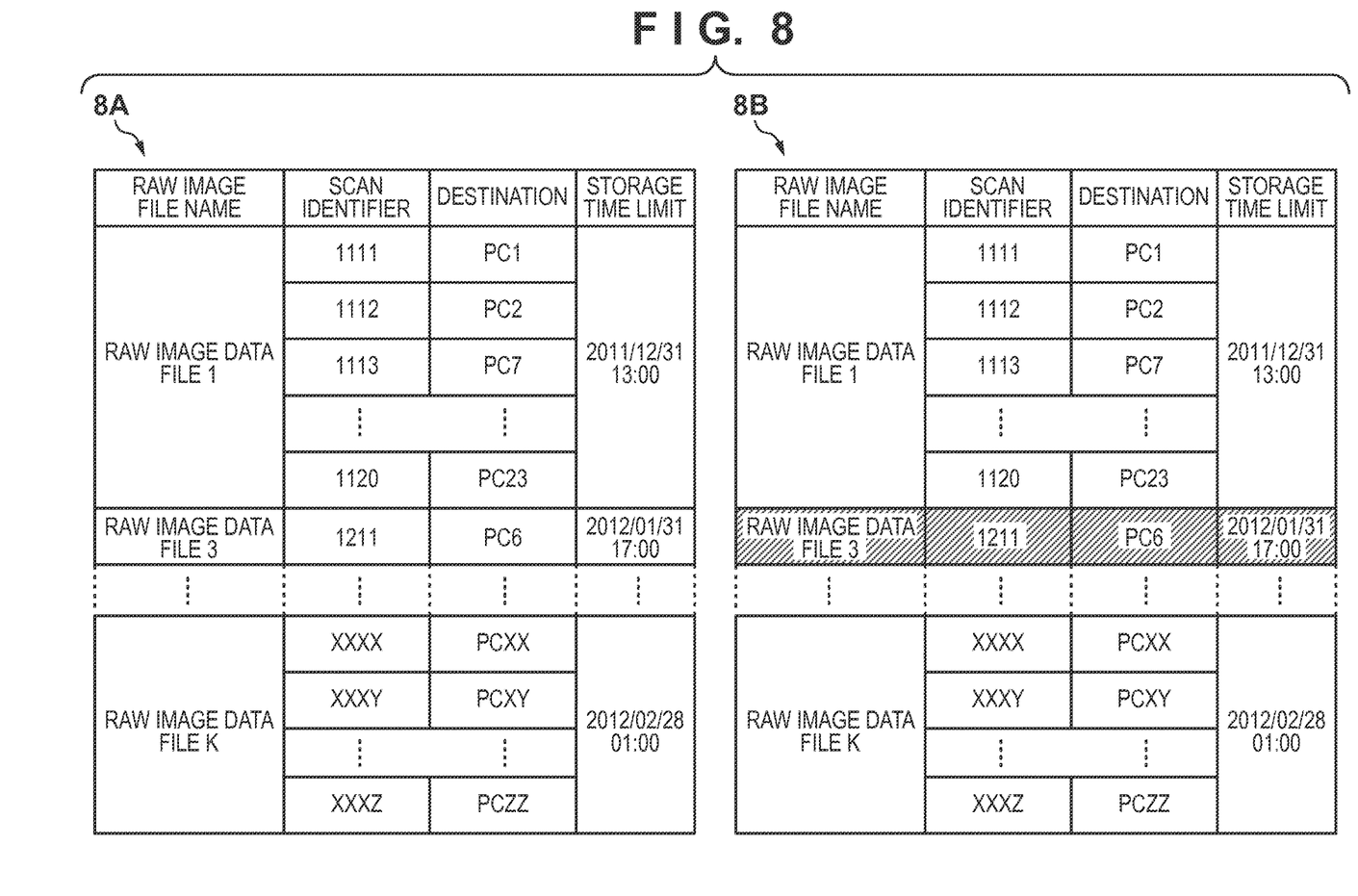
FIG. 8 is a view for explaining delete processing in step S218.

8A and 8B of FIG. 8 are views for explaining delete processing of raw image data in step S218.

8A of FIG. 8 shows the relationship among raw image data, scan identifiers, and destinations, which are stored in the HDD 13, and corresponds to FIG. 6 described above.

8B of FIG. 8 shows a state in which a raw image data file 3 is transmitted to a PC 6 and is deleted in this state. In 8B of FIG. 8, since only one combination of a scan identifier and destination is set for the raw image data file 3, all of the raw image data file 3, scan identifier, and destination indicated by hatching are deleted.

Then, the process advances to step S217, and the CPU 11 checks whether or not another combination of a destination and scan ID is associated with that raw image data. If no combination is associated, the process advances to step S218, and the CPU 11 deletes the raw image data stored in the HDD 13. This corresponds to the case shown in 8B of FIG. 8.

If a raw image data file 1 is normally transmitted to a PC 1, only a link between the raw image data file 1 and a scan identifier "1111" and that with the PC 1 are deleted, and the raw image data file 1 itself is not deleted. This is because other combinations of destinations and scan identifiers are associated with the raw image data file 1.

Figure 9:
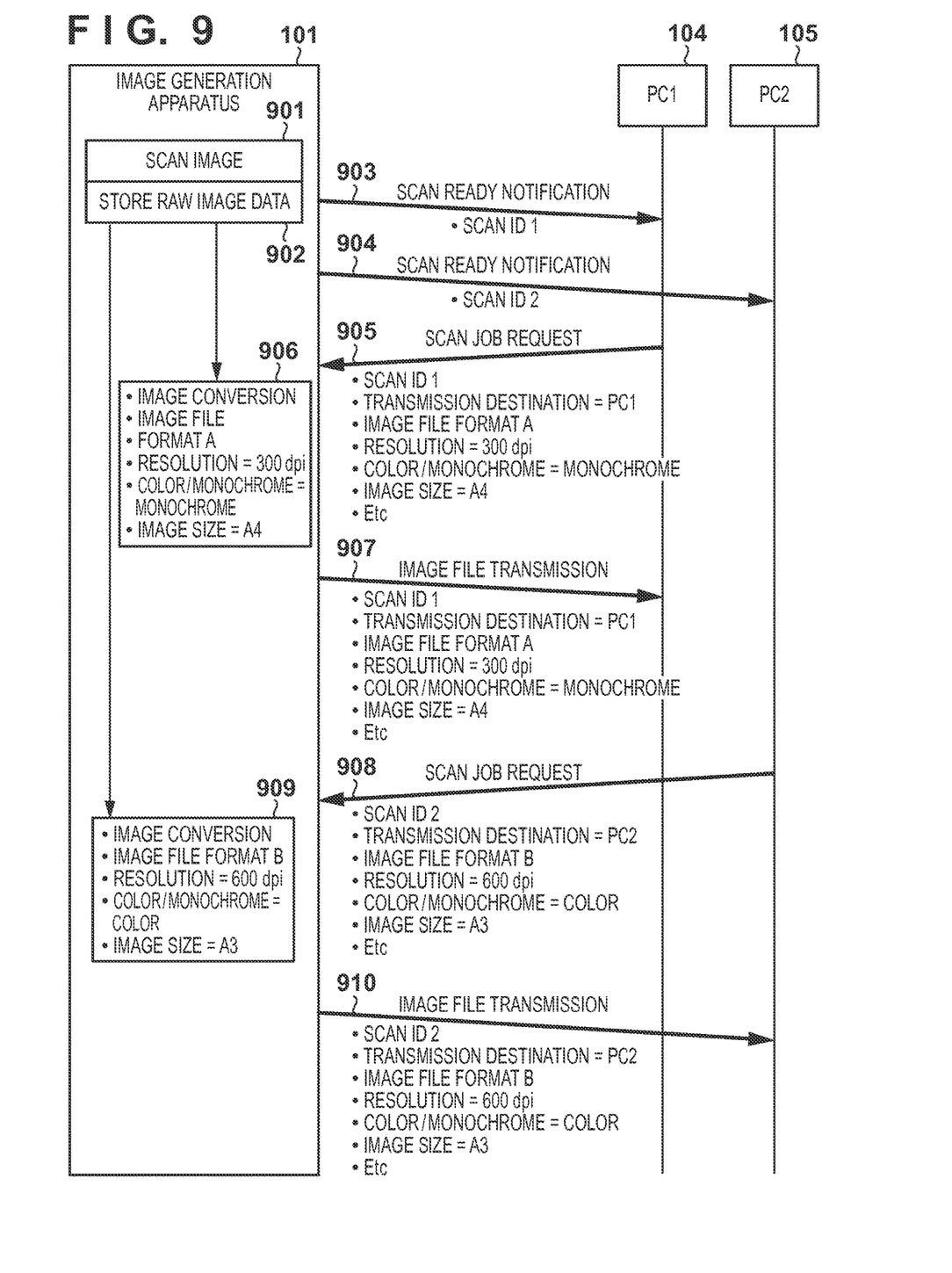
FIG. 9 is a chart showing a transfer sequence example of image data between the image processing apparatus according to the embodiment and a plurality of PCs.

FIG. 9 is a chart showing a transfer sequence example of image data between the image processing apparatus 101 according to this embodiment and a plurality of PCs.

When a document is set on the scanning unit 15 of the image processing apparatus 101, a scan ready notification is sent to the PC 104 (PC 1) in step 903. At this time, a scan identifier (scan ID 1) is set for this scan. Also, a scan ready notification is similarly sent to the PC 105 (PC 2) in step 904. At this time, a scan identifier (scan ID 2) is set for this scan. Then, the image processing apparatus 101 scans a document image using the scanning unit 15 to generate raw image data in step 901, and stores that data in the HDD 13 in step 902.

Thus, at this time, the user can pick up the document used in the scan from the scanning unit 15.

After that, a scan job request is received from the PC 104 (PC 1) in step 905. This scan job request is designated with the scan identifier (scan ID 1), a transmission destination (PC 1), and file format A as a format of an image file. Furthermore, assume that this request is designated with a resolution=300 dpi, monochrome mode, and A4 size as an image size. Thus, in step 906, the image conversion unit 17 generates an image file having a resolution=300 dpi, monochrome mode, A4 size, and file format A based on the raw image data stored in the HDD 13. Then, in step 907, that image file is transmitted to the PC 104 (PC 1).

Likewise, a scan job request is received from the PC 105 (PC 2) in step 908. This scan job request is designated with the scan identifier (scan ID 2), a transmission destination (PC 2), and file format B as a format of an image file. Furthermore, assume that this request is designated with a resolution=600 dpi, color mode, and A3 size as an image size. Thus, in step 909, the image conversion unit 17 generates an image file having a resolution=600 dpi, color mode, A3 size, and file format B based on the raw image data stored in the HDD 13. Then, in step 910, that image file is transmitted to the PC 105 (PC 2).

As described above, according to this embodiment, broadcast transmission which designates a plurality of different PCs as destinations can be implemented by the pseudo Push Scan without changing the control on the PC side.

When an image file generated from a single document is transmitted to a plurality of PCs by the pseudo Push Scan, the document need not be scanned by the scanning unit a plurality of times as many as the number of destination PCs unlike in the related art. Therefore, independently of the number of destination PCs, and different image parameters for respective PCs requested by scan job requests from these PCs, a document need only be scanned once to transmit image data having requested specifications to the plurality of PCs.

As described above, according to this embodiment, when the user sets a document on the scanning unit of the image processing apparatus to transmit a scan ready notification to a PC, the scanning unit 15 scans a document image, and saves image data in the HDD 13. Therefore, the user need only stand by the image processing apparatus 101 only for a time period required for the scanning unit to scan the document image, thus improving the user's convenience.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-146080, filed Jun. 28, 2012, which is hereby incorporated by reference herein in its entirety.

What is claimed is:

1. An image processing apparatus which receives a scan job request from an external apparatus, the image processing apparatus comprising:

a user interface configured to select an external apparatus as a transmission destination of image data, and receive a transmission start instruction, the user interface being able to select a plurality of external apparatuses;

one or more processors; and at least one memory having instructions stored thereon that, when executed by the one or more processors, cause the image processing apparatus to:

scan, in accordance with the transmission start instruction, a document and generate image data;

store, in a storage, the generated image data;

transmit a first notification to a first external apparatus selected by the user interface, and transmit a second notification to a second external apparatus selected by the user interface;

receive a first request transmitted from the first external apparatus as a response to the first notification and a second request transmitted from the second external apparatus as a response to the second notification;
convert the image data stored in the storage into first image data in accordance with first settings designated by the received first request and convert the image data stored in the storage into second image data in accordance with second settings designated by the received second request; and
transmit the converted first image data to the first external apparatus and transmit the converted second image data to the second external apparatus.

2. The apparatus according to claim 1, wherein the instructions, when executed by the one or more processors, further cause the image processing apparatus to:
determine whether received request is the first request received from the first external apparatus,
wherein, in a case where it is determined that the received request is the first request received from the first external apparatus, the stored image data stored in the storage is converted into the first image data;
determine whether the received request is the second request received from the second external apparatus,
wherein, in a case where it is determined that the received request is the second request received from the second external apparatus, the stored image data is converted into the second image data.

3. The apparatus according to claim 2, wherein the instructions, when executed by the one or more processors, further cause the image processing apparatus to generate a first identifier for identifying the first external apparatus and cause the image processing apparatus to generate a second identifier for identifying the second external apparatus,
wherein the generated first identifier, a transmission destination, and the generated image data, are stored associating with each other,
wherein the generated second identifier, a transmission destination, and the generated image data, are stored associating with each other,
wherein the received first request includes information regarding the generated identifier, and
wherein the received second request includes information regarding the generated identifier.

4. The apparatus according to claim 3, wherein the instructions, when executed by the one or more processors, further cause the image processing apparatus to delete an association among the generated first identifier, the transmission destination, and the generated image data and cause the image processing apparatus to delete an association among the generated second identifier, the transmission destination, and the generated image data, and
wherein the instructions, when executed by the one or more processors, further cause the image processing apparatus to delete the stored image data stored in the storage in accordance with deletion of all of associations.

5. The apparatus according to claim 1, wherein the at least one memory further has stored thereon a storage time limit for the image data, and
wherein the instructions, when executed by the one or more processors, further cause the image processing apparatus to delete the stored image data stored in the storage, when the storage time limit has expired.

6. The apparatus according to claim 1, wherein the first and second settings include any one of a file format, a color mode, a paper size, and a resolution.

7. A control method of controlling an image processing apparatus comprising:
receiving, via a user interface, selection of an external apparatus as a transmission destination of image data, selection of a first external apparatus and a second external apparatus being able to be received;
receiving, via the user interface, a transmission start instruction;
scanning, in accordance with the transmission start instruction, a document and generating image data;
storing, in a storage, the image data generated by the scanning;
transmitting a first notification to the first external apparatus selected via the user interface, and transmitting a second notification to the second external apparatus selected via the user interface;
receiving a first request transmitted from the first external apparatus as a response to the first notification and a second request transmitted from the second external apparatus as a response to the second notification;
converting the image data stored in the storage into first image data in accordance with first scan settings designated by the received first request and converting the image data stored in the storage into second image data in accordance with second settings designated by the received second request; and
transmitting the converted first image data to the first external apparatus and transmitting the converted second image data to the second external apparatus.

8. A non-transitory computer-readable storage medium storing a program for controlling a computer to execute:
receiving, via a user interface, selection of an external apparatus as a transmission destination of image data, selection of a first external apparatus and a second external apparatus being able to be received;
receiving, via the user interface, a transmission start instruction;
scanning, in accordance with the transmission start instruction, a document and generating image data;
storing, in a storage, the image data generated by the scanning;
transmitting a first notification to the first external apparatus selected via the user interface, and transmitting a second notification to the second external apparatus selected via the user interface;
receiving a first request transmitted from the first external apparatus as a response to the first notification and a second request transmitted from the second external apparatus as a response to the second notification;
converting the image data stored in the storage into first image data in accordance with first scan settings designated by the received first request, and converting the image data stored in the storage into second image data in accordance with second settings designated by the received second request; and
transmitting the converted first image data to the first external apparatus and transmitting the converted second image data to the second external apparatus.

* * * * *